(12) United States Patent
Werner et al.

(10) Patent No.: US 8,202,431 B2
(45) Date of Patent: Jun. 19, 2012

(54) METHOD FOR REMOVING IMPURITIES FROM A METAL DEPOSITION PROCESS SOLUTION

(75) Inventors: Christoph Werner, Düsseldorf (DE); Axel Fuhrmann, Neuss (DE); Andreas Möbius, Kaarst (DE)

(73) Assignee: Enthone Inc., West Haven, CT (US)

( * ) Notice: Subject to any disclaimer, the term of this patent is extended or adjusted under 35 U.S.C. 154(b) by 612 days.

(21) Appl. No.: 11/563,335

(22) Filed: Nov. 27, 2006

(65) Prior Publication Data

US 2007/0122324 A1 May 31, 2007

(30) Foreign Application Priority Data

Nov. 25, 2005 (EP) .................................... 05025726

(51) Int. Cl.
*C25D 21/22* (2006.01)
(52) U.S. Cl. ........... 210/673; 210/688; 210/692; 205/99
(58) Field of Classification Search .................. 210/681, 210/688, 691, 692, 673, 924; 205/99, 101, 205/594, 595; 423/139
See application file for complete search history.

(56) References Cited

U.S. PATENT DOCUMENTS

| | | | |
|---|---|---|---|
| 3,656,940 A * | 4/1972 | Gandon et al. | 423/139 |
| 3,663,403 A | 5/1972 | Christenson | |
| 3,707,447 A | 12/1972 | Alexander | |
| 5,192,418 A * | 3/1993 | Hughes et al. | 205/100 |
| 5,486,410 A * | 1/1996 | Groeger et al. | 442/353 |
| 5,885,462 A | 3/1999 | Biver | |
| 6,638,409 B1 * | 10/2003 | Huang et al. | 205/99 |
| 2002/0153254 A1 * | 10/2002 | Belongia et al. | 205/101 |

FOREIGN PATENT DOCUMENTS

| | | |
|---|---|---|
| CN | 1546461 | 11/2004 |
| CN | 1670018 | 9/2005 |
| DE | 4031526 A1 | 4/1992 |
| DE | 4318793 A1 | 12/1994 |
| DE | 4328876 A1 | 3/1995 |
| JP | 55104500 | 8/1980 |
| JP | 5214599 | 8/1993 |
| WO | 2004101866 A2 | 11/2004 |

OTHER PUBLICATIONS

Diphonix Ion Exchange Resin Product Literature, [online], [retrieved on Oct. 20, 2010], Retrieved from the Internet ,URL; www.eichrom.com/products/info/diphonix_resin.cfm.*
Abstract of Liping et al., "Study on the Kinetic of Treating Nitrate Wastewater by Denitrification Process", Environmental Protection of Chemical Industry, China Academic Journal Electronic Publishing House, 2003, 4 pages.
Abstract of JP55104500; Aug. 9, 1980.
Abstract of JP5214599; Aug. 24, 1993.
JP 59 197555A Abstract only, published Nov. 9, 1984, 1 pg.

(Continued)

*Primary Examiner* — Matthew Savage
(74) *Attorney, Agent, or Firm* — Senniger Powers LLP

(57) ABSTRACT

A method and apparatus involving at least two distinct adsorbent media for adsorptive removal of impurities from a metal deposition composition such as an electroless or electrolytic deposition composition.

11 Claims, 1 Drawing Sheet

OTHER PUBLICATIONS

Mobius, Andreas, "Plate Better, Longer—Electrolyte Maintenance Techniques Can Extend Bath Life", Product Finishing, Dec. 2006, pp. 22-25.

Mobius et al., "Moglichkeiten der Prozessbadregenerierung—vertieft am Beispiel von Nickelelektrolyten", Galvanotechnik, Sep. 2005, pp. 2054-2062.

Mobius et al., "Electrolyte Maintenance by Adsorber Polymer and Liquid-Liquid Extraction", presented at SurFin 2006, Sep. 2006, 8 pgs.

Abstract of CN1546461; Nov. 17, 2004.

Abstract of CN1670018; Sep. 21, 2005.

\* cited by examiner

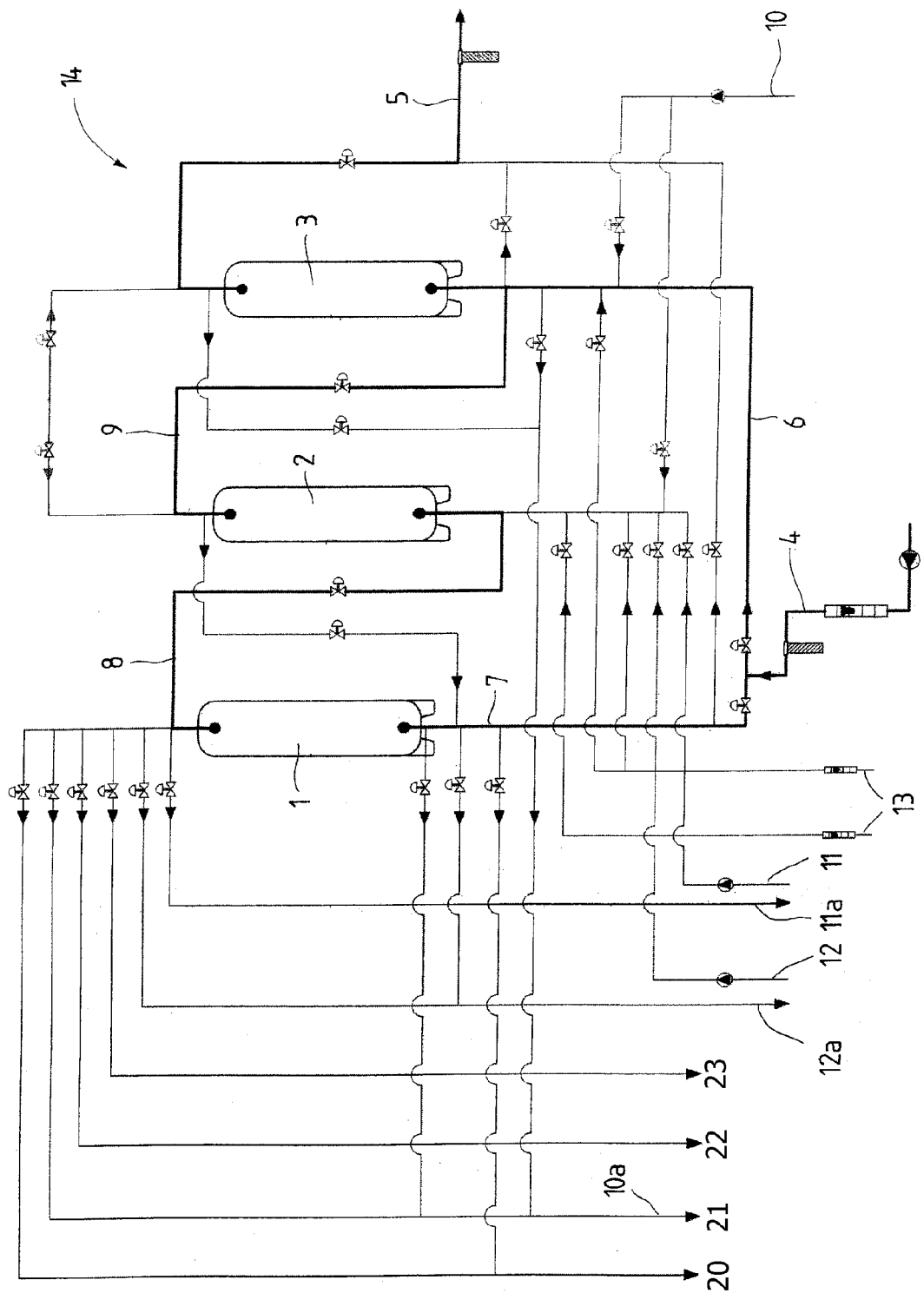

METHOD FOR REMOVING IMPURITIES FROM A METAL DEPOSITION PROCESS SOLUTION

CROSS REFERENCE TO RELATED APPLICATIONS

This application claims priority from EP patent application number 05025726.0 filed Nov. 25, 2005.

FIELD OF THE INVENTION

The present invention relates to a method and apparatus for the purification of a process solution that can be used in surface treatment, such as an electrolyte for the galvanic or autocatalytic deposition of a metal or metal alloy layer on a substrate, by at least partially removing organic or inorganic contraries from the process solution and thus increasing the service life of the process solution.

BACKGROUND OF THE INVENTION

Process baths in the surface treatment are subject to modifications due to the intended mass conversion, the dragging-in of water and impurities, the dragging-out of electrolyte and due to other influences such as evaporation, anodic or cathodic secondary reaction, the capture of components from the air and false dosages. This is the reason why the used process solutions have to be regenerated continuously or in certain intervals, if a new preparation and the dump of the old process solution related therewith shall be avoided. Very different methods for removing individual contraries from process solutions, in particular from electrolytes, are known from the state of the art. Herein, in particular filtration, oxidation, extraction as well as dialysis methods have to be mentioned.

The mentioned methods can be respectively subdivided in different sub-methods. Thus, it is known to filter the process solutions for removing particles such as metal flakes, dust particles, colloids, microorganisms, anode sludge etc. Herein, the process solutions are filtered by means of suitable filters, if necessary, using filter aids such as celite or active carbon, in order to remove the contraries from the process solution. It is a drawback of this method that a filter cake is formed on the filter in the course of the filtration, which filter cake can lead to an increased flow resistance in front of the filter and finally to a clogging-up of the filter. It is possible to maintain the flow resistance of the filter device on a constant value by means of extensive industrial instrumentation, for example by using band filters.

The contraries that can be removed by means of filtration depend on the design of the filter with respect to the size of the pores and the selection of corresponding filter aids.

One embodiment of the filtration relates to the micro- or ultra-filtration using suitable membrane filters. The membrane filters used herein have very small pore sizes with a high retaining power, but disadvantageously lead to a high flow resistance. The micro- or ultra-filtration is mainly used for degreasing baths or acid or alkaline pickling baths.

It is a common aspect of the filtration methods that parasitic substances that are completely dissolved in the process solutions cannot be removed from the process solutions by this technique.

However, many process solutions used in the surface treatment comprise organic components that are decomposed in the course of the treatment process and finally form decomposition products which interfere with the process chemistry. These interfering decomposition products are often completely soluble in the process solution and cannot be captured by means of filtration methods.

A method for removing these organic decomposition products is the oxidation of the decomposition products by means of for example UV-$H_2O_2$ oxidation.

Herein, at least partial volumes of a process bath, for example of a bright nickel electrolyte, are treated with UV/$H_2O_2$. The organic components of the electrolyte are discontinuously oxidized outside the bath. All organic compounds, decomposition products and also the acting brighteners and wetting agents are oxidized. In the case of a bright nickel electrolyte the end product of such a treatment is a Watts-type base preparation which can be again admixed to the process bath. The acting additives such as brighteners and wetting agents, which have also been oxidized during the UV/$H_2O_2$ oxidation, have to be correspondingly dosed again. Besides this drawback, the UV/$H_2O_2$ oxidation is not able to remove inorganic contraries, such as for example foreign ions which interfere with ions being deposited, from the process solutions.

Another possibility of the process solution purification is the liquid-liquid extraction with suitable liquid extraction agents. Herein, impurities are removed from the carrier liquid, for example a galvanic electrolyte to be purified, by means of a liquid extraction agent. The transport of substance from one fluid into the other that takes place herein results from the different solubilities of the substance in the fluids and the prevailing concentration gradient.

Herein, the extraction agent and the carrier liquid should be as insoluble with respect to each other as possible in order to assure a good separation and simultaneously carry over as less solvent as possible. In practice, one of the two phases is aqueous and the other one is an organic solvent or a solution of extraction agents in an organic solvent.

Since the extraction is a distribution between two non-mixable phases, the exchange and the establishment of equilibrium are realized via the interphase. A great interphase accelerates the establishment of equilibrium. Therefore, extractions on big technical scale are realized according to the mixer-settler principle. Herein, extraction agent and charged carrier liquid (electrolyte) are mixed with each other (mixer) in a first chamber. The mixture gets into the so called settler, the sedimentation chamber, via a gate of a dam. Here, the phases can separate again. The separated phases are then separately removed from the chamber. If the extraction result does not yet meet the requirements, several mixer-settler units can be placed subsequently.

The condition for a successful use of the liquid-liquid extraction is that a solvent is found which selectively dissolves the impurity to be removed and which can be easily separated again, and that the small residual quantities remaining in the electrolyte do not perturb the application aim of the process solution.

One embodiment of the liquid-liquid extraction is the membrane-supported extraction by means of hollow fibre modules. Herein, the organic extraction agent and the carrier liquid (electrolyte) are separated from each other by a porous membrane. In case of a microporous hydrophobic membrane, the organic phase will spontaneously wet the membrane and try to get through the pores to the other side of the membrane. This breaking-through can be avoided by a low overpressure on the side of the carrier liquid. The intersection between aqueous and organic phase can thus be immobilised in the pore mouth. The driving force of the substance exchange is here also the concentration gradient. The liquids are passed along both sides of the membrane. Herein, the flow rate of both phases can be varied in a wide range. Advantageously, also systems having the tendency to form emulsions can be treated with the hollow fibre supported membrane liquid-liquid extraction. Furthermore, a corresponding device for the hollow fibre module supported liquid-liquid extraction clearly requires less mobile parts in comparison to the extraction according to the mixer-settler principle.

A common aspect of the liquid-liquid extraction methods is that they are limited to corresponding non-mixable extraction/carrier liquid systems and usually no inorganic contraries, such as for example foreign ions, can be removed from the process solutions by means of the liquid-liquid extraction.

Other methods for the purification of process solutions, which are known from the state of the art, are the dialysis methods such as diffusion dialysis or electrodialysis. As in the extraction, in the ion-selective dialysis a concentration gradient is used for the substance transport between the phases, but here hydraulically impervious ion exchange membranes are used.

The centre of such a device is composed of membranes which are held together like a filter press. The anion-selective membranes theoretically retain all cations except the hydrogen ions, which migrate through the membrane due to their small size and their high mobility. The anions and the hydronium ions diffuse simultaneously. Therefore, only strongly dissociating acids offer good conditions for a use.

The process solution to be purified and the dialysis solution to be used, for example water, usually flow through the membrane stack according to the countercurrent principle. The two liquids are separated from each other by membranes and frames that enable the distribution in an alternating manner.

Besides anion-selective membranes, also cation-selective membranes or combinations of anion- and cation-selective membranes can be used.

One embodiment of the dialysis is the electrodialysis which is an electrochemical process, in which ionic components are removed from a solution or exchanged and, if necessary, concentrated by means of ion exchange membranes and the driving force of an electric field.

Herein, the created electric field can reinforce or also reverse the substance transport in the direction of the concentration gradient.

Electrodialysis units are able to also selectively separate ions that are dissolved in the process solutions. Disadvantageously, the used membranes are sensitive and, in particular in case of the electrodialysis, the method is related with a high energy demand.

Besides the already described methods, it is known from DE 43 28 876 A1 as well as from DE 43 18 793 A1 to use an adsorbent polymer for the elimination of organic contraries. Herein, the organic contraries are at least partially adsorbed on the surface of adsorbent polymers and thus removed from the process solution. Advantageously, such a method can be carried out continuously and the used adsorbent polymer can be regenerated by means of suitable solutions, for example a hydrogen peroxide bearing oxidation solution.

However, a drawback of this method is that the adsorbent polymer has to be adapted to the respective organic contraries to be removed and only removes this one very selectively. Furthermore, inorganic contraries such as for example foreign ions cannot be removed by means of this technique.

SUMMARY OF THE INVENTION

It is thus the object of the present invention to provide a method as well as a device which are able to remove a multitude of contraries from the process solution to be purified in a simple and cost-effective way while overcoming the drawbacks known from the state of the art.

Briefly, therefore, the invention is directed to a method for removing impurities from a metal deposition process solution comprising contacting the process solution with at least two distinct adsorbent media to remove the impurities from the process solution, wherein the adsorbent media are distinct from each other with respect to species of impurities adsorbed thereon.

The invention is also directed to a method for removing impurities from a metal deposition process solution employed in a metal deposition vessel for depositing a metal layer on a substrate, the method comprising removing a flow of the process solution from the metal deposition vessel; directing at least a portion of the flow of the process solution to a first polymer resin accommodation unit containing a first polymer resin for adsorbing organic impurities from the process solution and a second polymer resin accommodation unit containing a second polymer resin for adsorbing inorganic impurities from the process solution; returning said flow of process solution to the metal deposition vessel; wherein the first polymer resin is selected from the group consisting of polyacrylate resin, polystyrene resin, polyacrylamide resin, and divinylbenzene/styrene copolymerisate resin; wherein the second polymer resin is an ion exchange resin charged with an ion source corresponding to an ingredient contained in the process solution before the contacting, which ion source is at least partially transferred from the ion exchange resin into the process solution during the contacting; regenerating the first polymer resin by contacting the first polymer resin with a first regenerating solution; and regenerating the ion exchange resin by contacting the ion exchange resin with a second regenerating solution.

In another aspect the invention is directed to an apparatus for removal of impurities from a metal deposition process solution comprising a first adsorbent media accommodation unit and a second adsorbent media accommodation unit in fluidic communication with each other such that the process solution flows through each of the accommodation units; and a first adsorbent media in the first adsorbent media accommodation unit and a second adsorbent media in the second adsorbent media accommodation unit, wherein the two adsorbent media are distinct from each other with respect to species of impurities adsorbed thereon.

Other objects and features of the invention will be in-part apparent and in-part pointed out hereinafter.

BRIEF DESCRIPTION OF THE FIGURES

FIG. 1 is a schematic illustration of an embodiment of the device according to the invention.

DETAILED DESCRIPTION OF THE PREFERRED EMBODIMENT(S)

This application claims priority from EP patent application number 05025726.0 filed Nov. 25, 2005, the entire disclosure of which is herein incorporated by reference.

In one aspect the invention is a method for the purification of a process solution that can be used in the surface treatment, in particular an electrolyte for the galvanic or autocatalytic deposition of a metal layer on a substrate, by means of at least two distinct adsorbent media which are able to receive impurities and thus to at least partially remove the impurities from the process solution. The process solution is successively brought into contact with at least distinct adsorbent media or partial flows of the process solution are in parallel brought into contact with at least distinct adsorbent media. The adsorbent media differ from each other with respect to their physical-chemical properties. Herein, the use of the adsorbent media is not limited to a bath. They can also be connected to the stand rinsing unit or the most concentrated rinsing unit of a rinsing cascade and the purified rinsing water can be returned, if necessary, after having been concentrated again. The term process solution thus comprises a bath or a rinsing unit.

Herein, adsorbent media in the sense of the invention are adsorbent polymer resins and/or ion exchanger resins and/or activated carbon which are able to at least partially remove organic and/or inorganic impurities from the process solution. They comprise organic adsorbent resins with and without functional groups and/or inorganic adsorbent resins such as silicates, alumosilicates, boron nitrides and also zeolites. Organic adsorbent polymers can be cross-linked polyacrylates, polystyrene, polyacrylamide and divinylbenzene/styrene copolymerisates. Suitable polymer resins are available from a large variety of sources, including Lanxess, Dow Chemical, and Rohm & Haas. One suitable resin is a weakly acidic, macroporous anion exchange resin of crosslinked styrene-divinylbenzene copolymer with chelating aminodiacetate groups for selective adsorption of heavy metal cations such as Fe(III), Zn(II), and Cr(III), an example of which is available from Lanxess under the trade name Lewatit TP 207. Another is a crosslinked polystyrene-based macroporous ion exchange resin containing di-2-ethylhexyl-phosphat (D2EHPA), an example of which is available from Lanxess under the trade name Lewatit VP OC 1026. Another is a macroporous styrene divinylbenzene copolymer resin without functional groups available from Lanxess under the trade name Lewatit OC 1064 MD PH. Another is a microporous hypercrosslinked styrene divinylbenzene copolymer resin available from Lanxess under the trade name Lewatit VP OC 1163. In one preferred embodiment, the three distinct resins OC 1064, OC 1163, and TP 207 are used to remove impurities from an electroless nickel bath.

The invention employs at least two adsorbent media which are distinct from each other with respect to species of impurities adsorbed thereon. The respective media are distinct from each other in terms of their physical-chemical properties such as adsorption capacity thereof, the ion exchange capacity, the grain size, or the pore size.

According to the invention, the process solution is brought into contact with the adsorbent media in individual adsorbent media accommodation units that are separated from each other. The individual accommodating units of the media are advantageously in fluidic communication with each other, such that the process solution to be purified can be successively passed through the receiving units or partial flows of the process solution can be respectively passed in parallel through the receiving units. In one aspect there are two separate partial flows of the process solution contacting the at least two adsorbent media in parallel. In an alternative aspect there is one flow contacting the at least two adsorbent media successively in series.

According to the invention, the adsorbent media can be regenerated by means of suitable regeneration solutions. For this, the media are regenerated in the accommodating units by contacting the media with the regeneration solution. Advantageously, the media can be regenerated independently from each other by means of different regeneration solutions. In one embodiment of the method according to the invention, the media are at least partially regenerated by means of the same regeneration solution.

In another embodiment of the method according to the invention, the process solution is at least partially transferred from a process bath into an adsorption device, wherein the adsorption device at least comprises three accommodating units for accommodating at least two different adsorbent media, such that the process solution is successively brought into contact with the media in the accommodating units, wherein the two first accommodating units accommodate media that are able to at least partially adsorb organic impurities from the process solution and the last accommodating unit receives a media such as an ion exchanger resin that is able to at least partially remove inorganic impurities from the process solution.

In one aspect of the invention, at least the ion exchanger resin is charged with a substance such as an ion source contained in the process solution advantageously before being contacted with the process solution, which substance is decomposed or consumed in the course of the surface treatment process and has therefore to be replenished in the process solution. During contacting the process solution with the charged ion exchanger resin the substance is transferred into the process solution on the understanding that the amount of substance that has been decomposed or consumed in the surface treatment process will be at least partially replenished in the process solution.

In one embodiment, the at least two adsorbent media are polymer resins. In an alternative embodiment, at least one of the at least two adsorbent media is activated carbon. Activated carbon can be partially regenerated by treatment with hydrogen peroxide and/or sodium hydroxide-based regenerating solutions.

The method according to the invention is in particular adapted for the purification of electrolytes for the galvanic or autocatalytic coating of a surface with a metal layer.

The polymer resin that can be used in the method according to the invention in one preferred embodiment is advantageously a resin from the group consisting of divinylbenzene/styrene copolymerisate.

The polymer resin used in the method according to the invention can be regenerated by means of one or more regeneration solutions of the group comprising water, an alkaline aqueous solution, an alcoholic aqueous solution, an alkaline alcoholic solution, an acidic solution or an acidic alcoholic solution.

Furthermore, the regeneration solution can comprise an oxidizing agent or a reducing agent for the regeneration of the polymer resin.

Advantageously at least one regeneration solution comprises hydrogen peroxide as oxidizing agent.

The regeneration solution can comprise the oxidizing or reducing agent in a concentration comprised between about 0.1 and about 10% by weight, preferably between 1 and 5% by weight, more preferably between 1.5 and 3% by weight.

Due to the treatment of the polymer resins charged with organic contraries with a regeneration solution that contains an oxidizing agent, the organic contraries are oxidized. It has been found that the oxidized organic contraries are not adsorbed by the used polymer resins. Hereby, the solution that contains the oxidizing agent can advantageously used several times for the regeneration of the polymer resins, which is another economic and ecologic advantage of the method according to the invention.

The ion exchanger resin that can be used in the method according to the invention can be brought into contact with a saccharine bearing solution after regeneration and before contacting with the process solution, wherein the ion exchanger resin is charged with saccharine. Furthermore, the adsorbent resins can also be charged with suitable coating active substances.

Process solutions can be continuously purified by means of the method according to the invention. Furthermore, the method according to the invention can be combined with other methods for the purification of process solutions that are known from the state of the art, such as filtration, dialysis, electrodialysis, UV-$H_2O_2$, UV.$H_2O_2$ oxidation, extraction, crystallisation, precipitation.

With respect to the device, the aim 1s achieved by a device for the purification of a process solution in the surface treatment, in particular an electrolyte for the galvanic or autocatalytic deposition of a metal layer on a substrate, comprising at least two units for accommodating a polymer resin, that is characterized in that the units for accommodating a polymer resin are in fluidic communication such that the process solution successively flows through the units for accommodating a polymer resin or partial flows of the process solution respectively flow through the units in parallel, wherein the units accommodate polymer resins that are different with respect to their physical-chemical properties.

Among the impurities or contraries removable by the method of the invention are organic decomposition products formed by decomposition of organic additives during plating. Also, foreign ions which would interfere with plating, such as sodium and potassium ions, can be removed. Similarly, inorganic decomposition products formed by decomposition of inorganic additives during plating such as sulfates, nitrates, or ammonia formed by decomposition of sulfur-based, nitrogen-based, and ammonium-based additives, can be removed. Other removable impurities include surfactants dragged in from cleaning operations, plus fats, oils, and buffering agents, and copper-plating additives in the case of copper plating prior to nickel plating.

In one embodiment of the device according to the invention, a unit for accommodating a polymer resin accommodates a ion exchanger resin.

Furthermore, the units for accommodating an adsorbent resin and/or a ion exchanger resin can be in fluidic communication with at least one reservoir of a regeneration solution, such that for the regeneration of the resins the regeneration solution successively flows through the units or partial flows of the regeneration solution respectively flow in parallel through the units.

The unit for accommodating an adsorbent resin at least receives one adsorbent resin of the group consisting of polyacrylate, polystyrene, polyacrylamide and divinylbenzene/styrene copolymerisates.

According to the invention, the unit for accommodating an ion exchanger resin receives at least one ion exchanger resin of the group consisting of strongly acid, strongly basic, moderately acid, moderately basic, weak acid or weak basic ion exchanger resins.

In FIG. 1 an embodiment of the device according to the invention is represented. A process solution to be purified is withdrawn from a process bath and supplied via a supply 4 to the purification apparatus 14 for the treatment of the process solution. The apparatus 14 comprises two units 1 and 2 for accommodating an adsorbent resin and a unit 3 for accommodating a ion exchanger resin. The supply 4 is in fluidic communication with the units 1, 2 and 3 such that the process solution withdrawn from the process bath can flow through the units 1, 2 and 3 at least partially in parallel and/or successively and can then be returned to the process bath via a return 5. The units 1, 2 and 3 comprise a feeding pipe 10 for an acid regeneration solution as well as supplies 11, 12 and 13 for a solution that contains an oxidizing agent, an alkaline regeneration solution, and rinsing water, respectively. Furthermore, the units 1, 2 and 3 comprise returns 10a (return acid regeneration solution), 11a (return oxidizing agent bearing regeneration solution), and 12a (return alkaline regeneration solution) for the corresponding regeneration solutions alkaline waste 20, acid waste 21, DI water recycling 22, and nickel water rinsing 23. Hereby, the adsorbent and ion exchanger resins in the units 1, 2 and 3 can be brought into contact with the regeneration solutions and/or the oxidizing agent solution independently from each other for regeneration and the solutions can be separately collected after contact with the adsorbent resin and/or the ion exchanger resin. Thus, the regeneration solutions can be used several times for the regeneration of the adsorbent resin and/or ion exchanger resin. Pipes are shown at 7, 8, 9, and a bypass line at 6.

The following example show embodiments of the invented method, but the invention is not limited to them.

EXAMPLE

An electrolyte for the currentless deposition of nickel layers on substrate surfaces is withdrawn from the coating bath and supplied to a device according to the invention. The device according to the invention comprises a column filled with divinylbenzene/styrene copolymerisate adsorbent resin as well as a column filled with an acid ion exchanger resin. The nickel electrolyte withdrawn from the process bath is successively brought into contact with the adsorbent resin and the ion exchanger resin by means of a pump, wherein the adsorbent resin adsorbs the organic decomposition products that are present in the nickel electrolyte and the ion exchanger resin receives the parasitic ions that are present in the electrolyte, such as aluminium ions, and replaces them by hydrogen ions.

Partial flows of the process solution can also respectively flow in parallel through the adsorbent column and the ion exchanger column by means of suitable fluidic communications. This also enables a bypass of the adsorbent column, in order to be able to regenerate the adsorbent resin separately from the ion exchanger resin in case of need.

For regeneration, the adsorbent column and the ion exchanger column are connected in the above described manner to corresponding reservoirs of different regeneration solutions. The adsorbent polymer can be regenerated by means of the following regeneration procedure:
1. rinsing with water
2. regeneration with a 2.5% $H_2O_2$/2.5% HCl solution for about 2 hours
3. regeneration with a 6% NaOH solution.

In a last step the alkaline regenerated adsorbent resin can be acidified with a weak sulphuric acid solution in order to prevent a precipitation of nickel salts. After the steps 2. and/or 3., rinsing steps can optionally follow.

Other examples of surface treatment processes for which the method according to the invention and the device according to the invention can be used, are for example the deposition of a bright nickel layer or a semi-bright nickel layer on substrates as they are known from the *Taschenbuch für Galvanotechnik*, 13th edition 1988 or pulse reverse plating copper baths as they are known from EP 05009183.

The invention can also be applied to an acid tin/silver bath for the electrolytic deposition of lead-free silver alloy layers, which is operated with an insoluble anode. Herein, decomposition products have to be removed which are generated by decomposition of organic additives. A cation exchanger that is used in combination with adsorbent polymers can be previously or afterwards periodically charged with tin. The acid tin bath elutes tin from the cation exchanger which otherwise had to be dosed again. Thanks to the elution from the cation exchanger no additional contrary anions are introduced, i.e. the anion load is not increased. The adsorbent resin can be regenerated with $H_2O_2$ and NaOH, as in the other examples.

The method according to the invention as well as the device according to the invention can also be used for the electrolytes for the deposition of bronze that are known from EP 1 408 141 A1.

Since the method according to the invention and the device according to the invention are realized as multi-column system, it is assured that the individual adsorbent polymers and the ion exchanger polymers can be regenerated separately from each other and can thus be widely adapted to the electrolyte with respect to their adsorption or ion exchange properties. Furthermore, smaller volumes of regeneration solution and rinsing solution are required due to the use of the method according to the invention and the device according to the invention.

In view of the above, it will be seen that the several objects of the invention are achieved and other advantageous results attained.

When introducing elements of the present invention or the preferred embodiment(s) thereof, the articles "a," "an," "the," and "said" are intended to mean that there are one or more of the elements. And numerals such as " two polymer resin accommodation units" means that there are two or more of such units, unless specifically stated to be exactly "two," for example. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method for removing impurities from a metal deposition process solution for deposition of nickel wherein the process solution is a nickel electrolyte containing organic decomposition products comprising:
    contacting the nickel electrolyte process solution containing the organic decomposition products with at least two distinct adsorbent media to remove the impurities from the process solution, wherein the adsorbent media are distinct from each other with respect to species of impurities adsorbed thereon, and wherein the method excludes any steps for oxidizing the solution prior to the step of contacting the solution with the adsorbent media;
    wherein the process solution is a nickel electrolyte containing organic decomposition products; and
    wherein the at least two adsorbent media comprise a first polymer resin for removing said organic decomposition products, which resin is selected from the group consisting of polyacrylate resin, polystyrene resin, polyacrylamide resin, and divinylbenzene/styrene copolymerisate resin and wherein during said contacting said organic decomposition products are adsorbed onto the first polymer resin, and a second polymer resin which is an ion exchange resin for removing from the process solution inorganic metal ion impurities selected from the group consisting of copper, chromium, iron, and combinations thereof; and
    wherein the first and second polymer resins are in separate polymer resin accommodation units;
    regenerating the first polymer resin and the second polymer resin independently of each other wherein regenerating the first polymer resin comprises:
    bypassing the nickel electrolyte process solution around the first polymer resin, and
    contacting the first polymer resin with an oxidizing agent to oxidize the organic decomposition products adsorbed thereon.

2. The method of claim 1, further comprising a third polymer resin selected from the group consisting of polyacrylate resin, polystyrene resin, polyacrylamide resin, and divinylbenzene/styrene copolymerisate resin; wherein the first, second, and third polymer resins are in separate polymer resin accommodation units.

3. The method of claim 1 wherein the contacting the process solution with at least two adsorbent media comprises contacting two separate partial flows of the process solution with the at least two polymer resins in parallel.

4. The method according to claim 1 wherein the ion exchange resin is charged with an ion source corresponding to an ingredient contained in the process solution before the contacting, which ion source is at least partially transferred into the process solution during the contacting.

5. The method according to claim 1 wherein the process solution is an electrolyte for autocatalytic coating of a surface with a metal layer.

6. The method according to claim 1 wherein the process solution is continuously purified by means of the method.

7. The method according to claim 1 wherein the method is combined with at least one other method for purification of the process solution.

8. The method of claim 1 wherein the first and second polymer resin accommodation units are arranged in series so said at least said portion of the flow flows successively through said units.

9. The method of claim 1, wherein the first polymer resin is a macroporous styrene divinylbenzene copolymer resin without functional groups, and wherein the second polymer resin is a weakly acidic, macroporous anion exchange resin of crosslinked styrene-divinylbenzene copolymer with chelating aminodiacetate groups for selective adsorption of heavy metal cations.

10. The method of claim 1 wherein the metal deposition process solution is for currentless deposition of nickel and contains at least one organic additive.

11. The method of claim 1 wherein the regenerating the first polymer resin comprises contacting with hydrogen peroxide as the oxidizing agent and contacting with NaOH.

* * * * *